United States Patent Office 3,521,684
Patented July 28, 1970

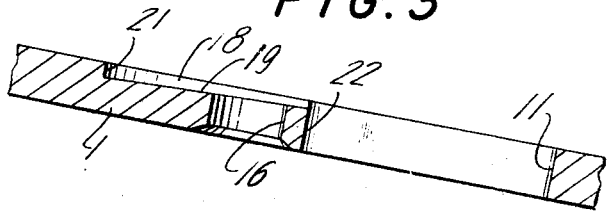
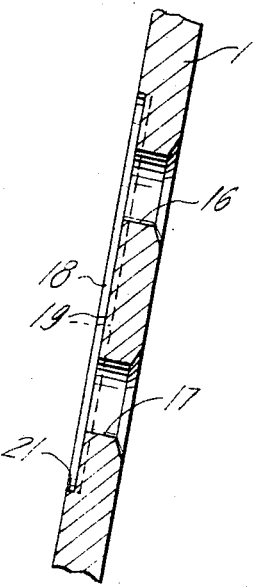
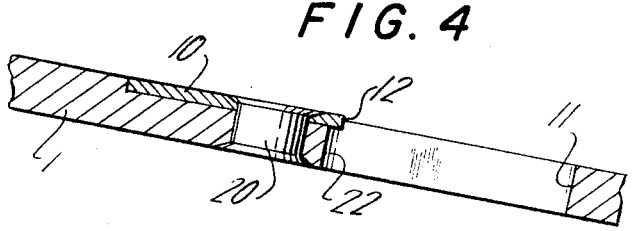
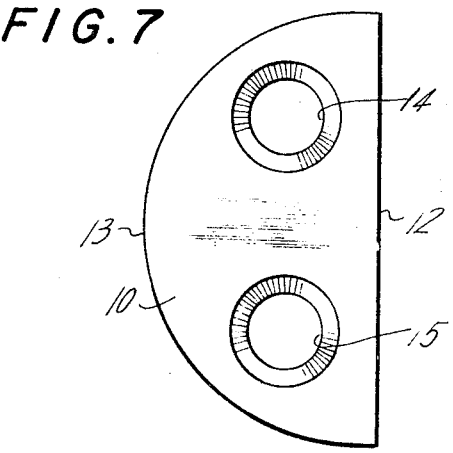
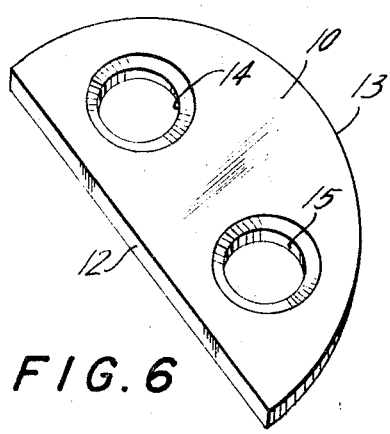
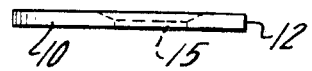

3,521,684
EDGER SAW
William J. McRobert, Beaverton, and Douglas W. Hensler, Milwaukee, Oreg., assignors to R. Hoe & Co., Inc., New York, N.Y., a corporation of New York
Filed Mar. 3, 1969, Ser. No. 803,597
Int. Cl. B27b 33/08
U.S. Cl. 143—140                                9 Claims

ABSTRACT OF THE DISCLOSURE

A circular saw having a notched periphery fitted with carbide or other teeth mounted or otherwise secured on the back walls of the notches, having a central opening for shaft mounting the saw body. The body of the saw is provided with a plurality of angularly and radially distributed face cutters for cleaning the cut made by the saw teeth and for relieving friction between the saw body and the cut wood, so as to relieve the saw blade of bind as it engages the wood. The cutter elements are arranged about the surface of the blade so that their cutting edges cover the area from the notched periphery to within reason of the hub on both faces of the saw blade body.

BACKGROUND OF THE INVENTION

This invention relates generally to circular saws, and more particularly to edger saws, or saws having face cutters for cleaning the cut surface of the wood and for relieving bind of the saw in the cut area.

The general object of the prior edger saws has been to provide a saw of the type indicated in which the face cutters are capable of cleaning the kerf which is produced by the saw teeth and for relieving bind of the saw body in the cut area of the wood due to friction between the blade body and the cut wood. The object of the improvement contemplated by the present invention is to provide such a saw in which the face cutters are of simple and rugged design and construction for minimum cost in manufacturing, in which they are easily replaceable and which cooperate effectively with apertures in the saw blade body adjacent the cutting edges of the cutter elements for rapidly and efficiently removing the chips of wood remaining in the kerf.

Another object of the present invention is to provide a circular saw in which each aperture is associated with a single cutter on only one face of the saw disc body, and in which the cutters are located alternately on opposite faces of the saw disc body.

Other objects advantages and features of the present invention will become more apparent from the following detailed description in connection with the accompanying drawings.

BRIEF DESCRIPTION OF THE DRAWINGS

In the drawings:
FIG. 3 is a sectional view taken along line 3—3 of FIG. 2;
FIG. 4 is a view similar to that of FIG. 3 showing the cutter mounted in place;
FIG. 5 is a sectional view taken along line 5—5 of FIG. 2;
FIG. 6 is an enlarged perspective view of the cutter element;
FIG. 7 is an elevational face view of the cutter shown in FIG. 6;
and
FIG. 8 is a side view of the cutter shown in FIG. 7.

DESCRIPTION OF THE INVENTION

Figure 1:
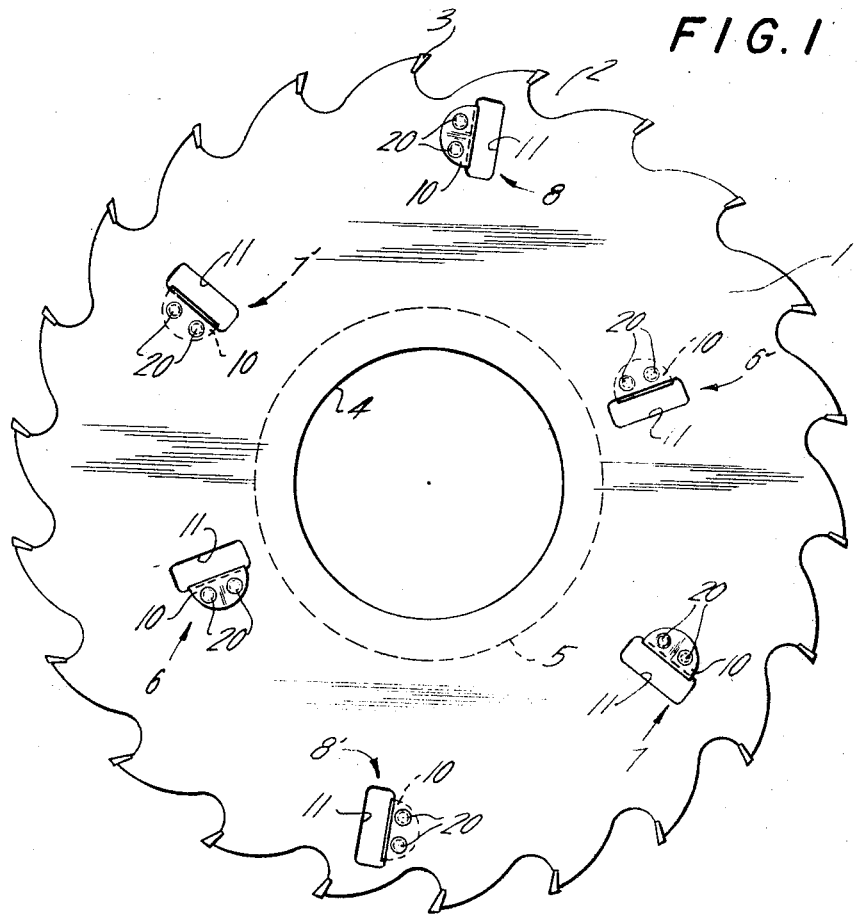
FIG. 1 is a face elevational view of the saw.
Figure 2:
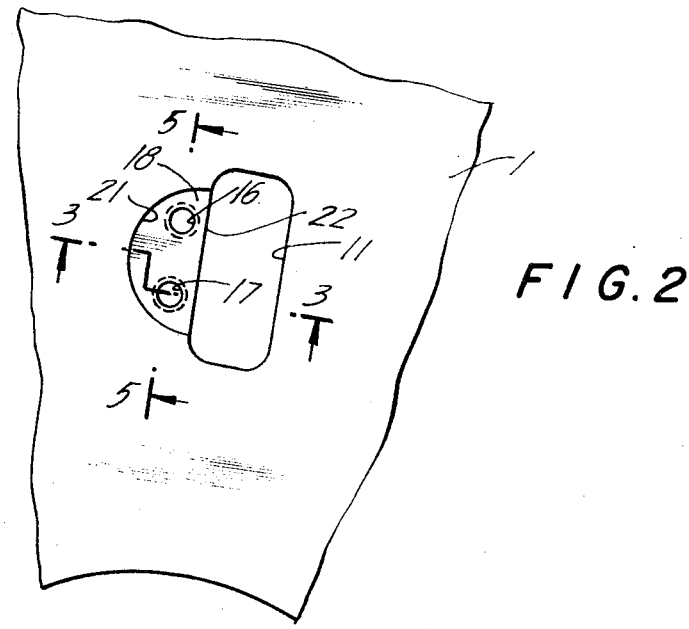
FIG. 2 is an enlarged face elevational view showing one of the apertures and mounting recesses for receiving a face cutter.

Referring now in detail to the drawings, there is shown in FIG. 1 a saw blade body 1 having a periphery provided with notches 2. Tungsten carbide teeth 3 are brazed or otherwise secured in place on the back walls of the notches 2. The saw disc body has a central opening 4 for mounting it on a rotary drive shaft, and the dotted line 5 indicates the profile of the disc supporting hub or washer. Each face of the saw disc body has an exposed surface between the dotted line 5 and the notched periphery.

A plurality of face cutters 10 are provided there being six such cutters, by way of example, in the saw shown in FIG. 1, these cutters being spaced around the disc in angular positions differing by 60 degrees and also being spaced radially so as to cover as a group the entire annular space from the profile 5 of the washer or hub element to the notches 2 on both faces of the saw disc body. The cutters 10 in the saw shown, form two sets or groups. The cutters located at positions 6, 7, and 8 form one such group while the cutters at positions 6', 7' and 8' form the second group. The cutters of the first group (at positions 6, 7, and 8) are mounted on one face (obverse) of the disc body and operate over successively touching or slightly overlapping annular areas, spanning the entire distance from line 5 to the notched periphery of the saw body, so that the entire kerf on that side is acted upon. The cutters of the second group (at positions 6', 7' and 8') are mounted on the other face (reverse) of the disc body and also operate over successively touching or slightly overlapping annular areas on the other side, also spanning the entire distance from line 5 to the notched periphery of the saw body so that the opposite face of the kerf is also acted on. With the cutters mounted in place, the saw is properly balanced for smooth operation due to there being an equal number of identical cutter elements on each face of the saw disc body and being alternately spaced on each side, i.e. positions 6, 7, and 8 being located inbetween positions 6', 7' and 8' and being respectively located symmetrically with respect to the center of the saw.

FIGS. 6, 7, and 8 show the cutter element 10 in various views. The cutter is provided with a cutting edge 12 and a generally semicircular border 13. It is further provided with a pair of countersunk bores 14 and 15 for receiving a fastening means so as to secure the cutter element to the disc body. It has been found that for the embodiment shown herein, a cutting edge of approximately 1½ inches is satisfactory, this being more than twice the radial extent of the saw tooth 3 (and in fact, in the embodiment illustrated, over three times such extent).

The cutters are mounted in substantially semicircular recesses 18 provided with countersunk bores 16 and 17. The recess 18 is shaped so as to receive the cutter element and has an inclined bottom surface 19 so that when the cutter 10 is mounted in the recess and resting on the bottom surface thereof, the cutting edge 12 extends beyond the surface of the saw disc body and is substantially radially oriented. The bottom surface 19 is inclined at a suitable draft angle of approximately one degree thirty minutes from the surface of the disc body and away from wall 22. The depth of the recess 18 at its rear wall 21, is equal to the thickness of the cutter element 10 (approximately .042 inch) so that when the cutter is mounted in the recess its circular border fits flush with the surface of the saw disc body and only its cutting edge protrudes beyond that surface. The recesses are identically formed and alternately located on the faces of the saw disc body thereby forming the two groups discussed above. The surface of the saw disc opposite each recess is flush with the saw disc generally, so that with the same thickness of disc, and cutters, over twice the thickness of supporting metal may be left after forming the recess.

Adjacent each recess is an aperture 11 extending entirely through the saw disc body. The aperture is generally of a rectangular shape having a circumferential width of approximately ⅞ of an inch and a radial length of approximately 2 inches, being large enough so that the chips of wood can easily pass therethrough. The rear wall 22 (with respect to the direction of rotation of the saw) of the aperture 11 defines the forward facing wall of the recessed area 18. The bores 16 and 17, passing through the remaining thickness, are located so as to be aligned with bores 14 and 15 of the cutter element, when the cutter is mounted in the recess, so as to receive a means for fastening the cutter in place.

When the cutters 10 are mounted in the recesses 18, the cutting edge, as described above, will extend beyond the surface of the saw disc body and will slightly overhang into the aperture 11, as seen in FIG. 4. Because the recess 18 has an inclined bottom surface 19 the cutter element 10 need not be specially machined for producing the desired effect. Rather, the cutter element may be of uniform thickness across its entire width and is therefore simple to manufacture as by moulding. Tht cutters are typically formed by powder metallurgy and are of tungsten carbide or other very hard material.

The face cutters are mounted in the recesses 18 by means of a rivet or similar fastener 20 passing through countersunk bores 14, 16 and 15, 17. The embodiment shown herein provides for two such rivets so as to eliminate the possibility of any wobble by the cutter in the recess. For example, if only one such rivet were provided the cutter being of uniform thickness, there might be a tendency for the cutter element to pivot or rotate about that rivet while the saw is in operation thereby shifting the radial alignment of the cutting edge and detracting from the efficiency of the cutter. The use of two rivets of course eliminates any possibility of such pivot or rotation thereby maintaining the correct radial alignment of the cutting edge. The rivets 20 are exceptionally massive with respect to the size of the cutter, preferably having a diameter about one-third the circumferential width of the recess 18 and cutter element 10.

While the invention has been described and illustrated with respect to a certain preferred embodiment which gives satisfactory results, it will be understood by those skilled in the art, after understanding the purpose of the invention that various changes and modifications may be made without departing from the spirit and scope of the invention.

What is claimed is:

1. A circular saw comprising a saw disc body having a central opening and a notched periphery, a saw tooth carried on the back of each notch, a plurality of circumferentially and radially spaced apertures, said apertures being arranged in pairs symmetrically disposed about the center of the saw, a recess having an inclined bottom surface adjacent each said aperture, said recesses being alternately arranged about each face of said saw disc body so as to form two groups of recesses, each group having the same amount of odd number of recesses, the recesses adjacent said pair of apertures being located on opposite faces of the saw disc body and each group having their recesses located on opposite faces of the saw disc body, a cutter element secured within each of said recesses comprising a substantially semicircular disc having a cutting edge and a semicircular border, said cutter being of uniform thickness and equal to the depth of recess at its deepest point whereby said cutter is inclined at an angle to the surface of said saw disc body when mounted in the recess so that said cutting edge extends beyond the surface of said saw disc body, and means for securing said cutter in said recesses.

2. The circular saw according to claim 1 wherein said means for securing said cutter in said recesses comprises two rivets passing through said cutter and said saw disc body.

3. The circular saw according to claim 1 wherein said cutting edges are oriented substantially along a radial line of said saw.

4. The circular saw according to claim 3 wherein said apertures are substantially rectangular in shape having a radial length which is larger than the length of said cutting edge, whereby sufficient space is provided for a chip cut by said edge to pass or be passed through the aperture in the direction of the cut.

5. A circular saw comprising:
   a saw disc body having a central opening for shaft mounting the saw and a notched periphery;
   a saw tooth carried on the back edges of each of said notches;
   a plurality of radially and circumferentially spaced apertures being disposed in pairs symmetrically about the center of said saw each said aperture being defined in part by a wall on the trailing side of the aperture with respect to the direction of rotation of said saw;
   a recess leading from the said wall of said aperture and extending away therefrom, said recess extending partially into said saw disc body from only one face thereof leaving thickness between the bottom surface of said recess and the opposite face of said saw disc body, said bottom surface of said recess being inclined at an angle to the surface of said saw disc body so that said incline extends downwardly from the surface of said saw disc body and away from said wall;
   said recesses being alternately arranged on opposite faces of the saw disc body so that the recesses adjacent every other aperture are on the same side of the saw disc body;
   a cutter mounted within each of said recesses comprising a semicircular disc having a semicircular border and a cutting edge opposite said semicircular border, said disc being of uniform thickness and equal to the depth of said recess at its deepest point so that when said cutting element is mounted in said recess it is inclined at an angle to the surface of the saw disc body so that said circular border fits flush with the surface of said saw disc body and said cutting edge extends beyond the surface of said saw disc body;
   said cutter being supported in said recess by means of two rivets passing through said cutter and the said remaining thickness;
   said cutting edges being located substantially radially and as a group extending substantially across the exposed surface of both faces of said disc body.

6. The circular saw according to claim 5 wherein said cutting edge has at least twice the radial extent of the said teeth.

7. The circular saw according to claim 5 wherein said apertures are substantially rectangular in shape having a radial length which is larger than the length of said cutting edge, whereby sufficient space is provided for a chip cut by said edge to pass or be passed through the aperture in the direction of the cut.

8. The circular saw according to claim 7 wherein said cutters are placed substantially midway radially of the said walls on the trailing sides of the apertures.

9. The circular saw according to claim 8 wherein said bottom surface of said recess is inclined at an angle of approximately 10°, 30′ to the surface of the saw disc body.

References Cited

UNITED STATES PATENTS

| 60,827 | 1/1867 | Bee | 143—143 |
|---|---|---|---|
| 152,437 | 6/1874 | Tunis | 143—143 |
| 301,841 | 7/1884 | Troeme-Becker | 143—140 |

DONALD R. SCHRAN, Primary Examiner